United States Patent
Jin et al.

(10) Patent No.: US 8,311,482 B2
(45) Date of Patent: Nov. 13, 2012

(54) SELF-OPTIMIZING WIRELESS NETWORK BASE STATION

(75) Inventors: Hang Jin, Plano, TX (US); John Grabner, Plano, TX (US)

(73) Assignee: Cisco Technology Inc., San Jose, CA (US)

( * ) Notice: Subject to any disclaimer, the term of this patent is extended or adjusted under 35 U.S.C. 154(b) by 363 days.

(21) Appl. No.: 12/433,083

(22) Filed: Apr. 30, 2009

(65) Prior Publication Data
US 2010/0279616 A1    Nov. 4, 2010

(51) Int. Cl.
    H04B 15/00    (2006.01)
(52) U.S. Cl. .......................................... 455/62; 455/446
(58) Field of Classification Search .................. 455/446, 455/62
    See application file for complete search history.

(56) References Cited

U.S. PATENT DOCUMENTS

| | | | |
|---|---|---|---|
| 7,515,916 B1 * | 4/2009 | Alexander | 455/456.1 |
| 2005/0272472 A1 | 12/2005 | Goldberg et al. | |
| 2005/0288034 A1 | 12/2005 | Judson et al. | |
| 2008/0268865 A1 * | 10/2008 | Tung | 455/456.1 |
| 2009/0253438 A1 | 10/2009 | Chater-Lea et al. | |

OTHER PUBLICATIONS

PCT International Search Report and Written Opinion in counterpart International Application No. PCT/US2010/022792, mailed May 6, 2010.

* cited by examiner

*Primary Examiner* — Lincoln Donovan
*Assistant Examiner* — Shikha Goyal
(74) *Attorney, Agent, or Firm* — Edell, Shapiro & Finnan, LLC

(57) ABSTRACT

A wireless base station apparatus is provided that is configured to automatically optimize the radiation pattern it uses when installed for operation in a wireless network in order to serve wireless client devices within a coverage area. The wireless base station is configured to determine its geographical location and to evaluate its geographical location based on stored geographical map data that indicates the physical geographical environment surrounding its geographical location. Based on the physical geographical environment surrounding the geographical location, the base station determines a radiation pattern best suited to serve wireless client devices within a coverage area.

22 Claims, 9 Drawing Sheets

SELF-OPTIMIZING WIRELESS NETWORK BASE STATION

TECHNICAL FIELD

The present disclosure relates to wireless communication devices and systems and more particularly to a base station device configured to automatically optimize its radiation pattern upon deployment in a geographical region.

BACKGROUND

In a conventional wireless cellular communication network, there are clusters of adjoining coverage areas, known as cells. A base station device is positioned in a centralized or other location of each cell to serve wireless client devices in its cell. For example, the base station device is mounted on top of a pole or tower in order to transmit and receive signals above the ground. While deploying a base station in this manner is suitable for many geographical regions, it is not always suitable for deployment in an urban area where there are densely arranged buildings and other obstructions.

The ability to deploy a base station in an urban geographical environment or setting is more challenging for a variety of reasons. In general, installation of base station equipment is dictated by space availability and cost, and not by what will provide the best radio frequency (RF) coverage. There may be zoning restrictions that limit the ability to build a new tower, or in some cases, make it too expensive to do so. Likewise, in an urban setting, space availability on a building roof for new antenna installations may be limited. RF coverage planning is challenging in an urban setting due to the complexity of the physical geographical features created by densely populated buildings. Moreover, in an urban setting, transmitted RF signals propagate through "tunnels" created between buildings over streets, and not over the roofs of buildings. As a consequence of this tunneling effect, RF signals can propagate quite far along the streets causing inter-cell interference.

The concept of a "pico" or "mini" wireless base station has evolved in order to meet the challenges associated with deploying wireless network service in an urban environment. A pico base station has a smaller form factor than a standard base station and can therefore be installed on a building wall, pole, and other similar places, without the need for a tower or space on a roof. By design, a pico base station is configured to transmit with less power than that used by a standard base station and thus serves a smaller coverage area. The smaller sized base station can be installed in such a manner to better distribute RF transmissions around buildings, etc. Moreover, since the pico base station transmits at lower power, it can be installed in a wide variety of locations without violating power emission regulations. The pico base station can be built at a lower cost, making it attractive for massive deployment in a dense urban environment in order to achieve the higher capacity requirements associated with a densely populated urban area.

Deploying a pico base station has its challenges. Installation of a pico base station may be performed anywhere by any person, and not necessarily by an experience wireless system installer. Since the street morphology differs dramatically from one urban location to another and the installation may be made by non-experts to keep system deployment costs lower, there is no "one-size-fits-all" optimal RF radiation pattern that can configured for a base station device in order to achieve acceptable performance in a coverage area. Furthermore, maintaining a network of numerous pico base stations is a substantial effort. In a given urban setting, there may be thousands of pico base stations. It is a major challenge to optimize so many pico base stations for better coverage, capacity loading and carrier-to-interference (C/I) ratio across the entire network.

DESCRIPTION OF EXAMPLE EMBODIMENTS

Overview

A wireless base station apparatus is provided that is configured to automatically optimize the radiation pattern it uses when installed for operation in a wireless network in order to serve wireless client devices within a coverage area. Corresponding method and logic configured to allow a base station to automatically optimize itself are also provided. The wireless base station is configured to determine its geographical location and to evaluate its geographical location based on stored geographical map data that indicates the physical geographical environment surrounding its geographical location. Based on the physical geographical environment surrounding the geographical location, the base station determines a radiation pattern best suited to serve wireless client devices within a coverage area. The base station uses the radiation pattern derived from its geographical location and map data for transmitting broadcast messages and in so doing the radiation pattern determines the coverage of the base station.

Figure 1:
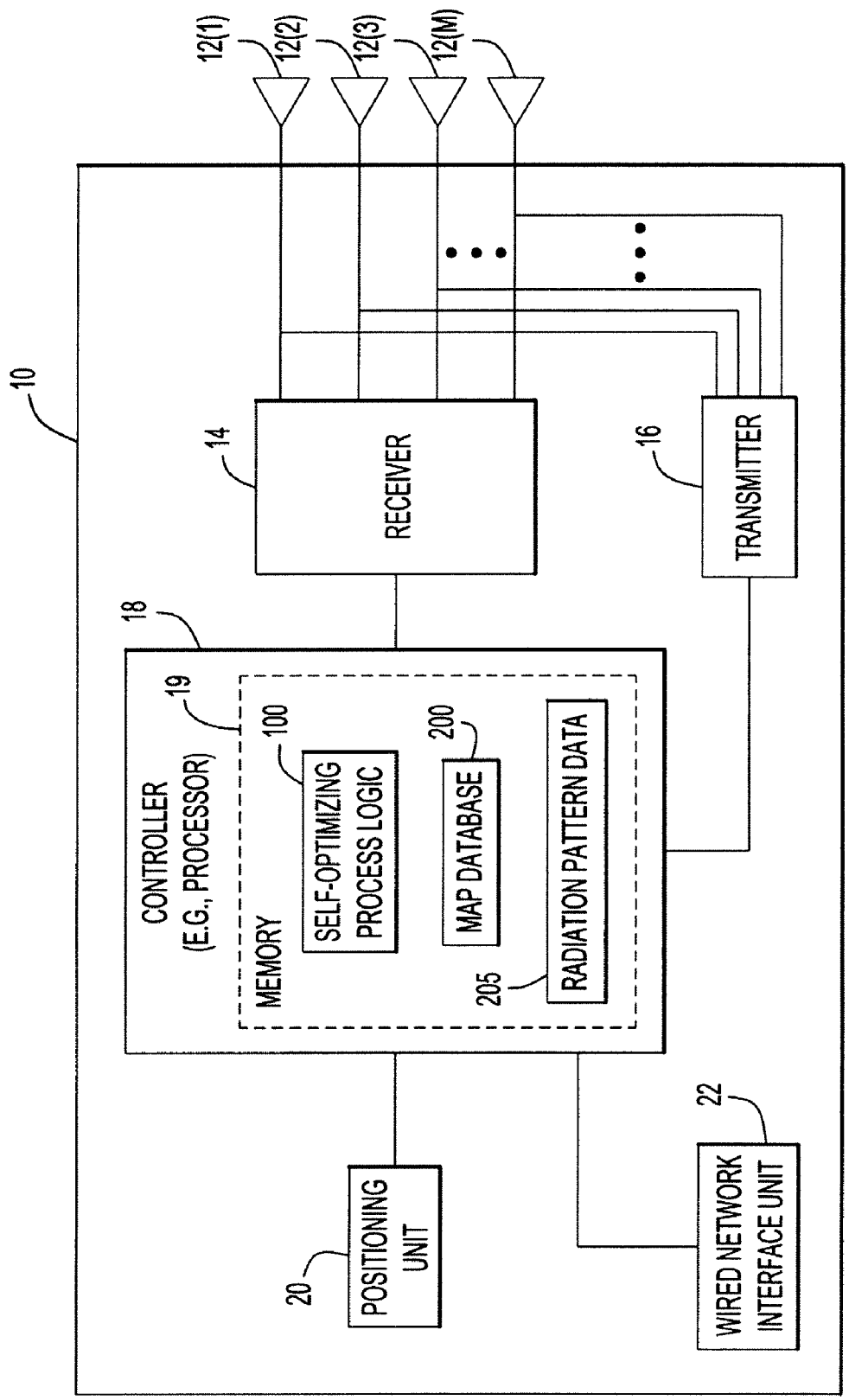
FIG. 1 a block diagram of a wireless base station configured to automatically optimize its radiation pattern upon deployment for operation in a wireless network.

Reference is now made to FIG. 1 that shows an example of a block diagram of a self-optimizing wireless network base station (BS) 10. The BS 10 comprises a plurality of antennas 12(1)-12(M) forming an antenna array, a radio receiver 14, a radio transmitter 16 and a controller 18. The controller 18 supplies data to the transmitter 16 to be transmitted and processes signals received by the receiver 14. In addition, the controller 18 performs other transmit and receive control functionality. Parts of the functions of the receiver 14, transmitter 16 and controller 18 may be implemented in a modem and other parts of the receiver 14 and transmitter 16 may be implemented in radio transmitter and radio transceiver circuits. It should be understood that there are analog-to-digital converters (ADCs) and digital-to-analog converters (DACs) in the various signal paths to convert between analog and digital signals.

The receiver 14 may comprise a plurality of individual receiver circuits, each for a corresponding one of a plurality of antennas 12(1)-12(M) and which outputs a receive signal associated with a signal detected by a respective one of the plurality of antennas 12(1)-12(M). For simplicity, these individual receiver circuits are not shown. The receiver 14 receives the signals detected by each of the antennas 12(1)-12(M) and supplies corresponding antenna-specific receive signals to controller 18. Likewise, the transmitter 16 may comprise individual transmitter circuits that supply respective upconverted signals to corresponding ones of a plurality of antennas 12(1)-12(M) for transmission. For simplicity, these individual transmitter circuits are not shown.

The controller 18 is, for example, a data processor, e.g., a microprocessor or microcontroller, and comprises a memory 19 or other data storage block that stores data used for the techniques described herein. The memory 19 may be separate or part of the controller 18.

The BS 10 further comprises a positioning unit 20 that is configured to determine a geographical location of the BS 10. For example, the positioning unit 20 is a global positioning system (GPS) satellite receiver unit (chipset) that receives signals from multiple satellites and uses data from those received satellite signals to compute coordinates representing the geographical location of the BS 10. The positioning unit 20 is configured to respond to a command from the controller 18 in order to perform a location determination session to produce coordinates of the BS 10. An antenna dedicated to the positioning unit 20 may be provided, but it is not shown in FIG. 1 for simplicity.

The BS 10 may serve as a gateway for a plurality of remote wireless client devices in a wireless network. To this end, the BS 10 comprises a wired network interface unit 22 (e.g., Ethernet controller) that allows the BS 10 to communicate over a wired network (e.g., the Internet) with other devices, such as other base stations or with a network management system (not shown).

Instructions for self-optimizing process logic 100 may be stored in the memory 19 for execution by the controller 18. In addition, the memory 19 stores a map database 200 comprising geographical map data for a variety of regions where the BS 10 is likely to be deployed and radiation pattern data 205 for a plurality of radiation patterns to be used for transmissions that the BS 10 makes in its coverage area. FIGS. 6A-6G, described hereinafter, are examples of the radiation patterns that the radiation pattern data 205 may be configured to produce for the BS 10. The radiation pattern data may comprise a set of antenna weights (amplitude and phase) to be applied to a transmission to be sent from the BS 10 into the coverage area, whether a broadcast transmission or a directed transmission, in order to synthesize a desired radiation pattern. That is, the radiation pattern data comprises a set of antenna beamforming weights designed to achieve a corresponding one of a plurality of radiation patterns when applied to a signal to be transmitted via the plurality of antennas 12(1)-12(M). In general, the BS 10 uses the radiation pattern derived from its geographical location and map data for transmitting broadcast messages and in so doing the radiation pattern determines the coverage of the BS 10. However, in some cases where the BS 10 does not have an accurate estimate of beamforming weights for a particular wireless client device, the BS 10 may use the same radiation pattern otherwise used for broadcast messages for transmitting unicast or directed messages to a wireless client device.

The BS 10 wirelessly communicates with wireless client devices using any wireless communication protocol, an example of which is the IEEE 802.16 communication standard, known commercially as WiMAX™. To this end, the controller 18 is configured to apply the appropriate modulation and packet format to a transmission and likewise to recover and demodulate a received transmission according to the rules of the communication protocol employed.

The map data stored in the map database 200 may be installed in the memory 19 at the time the BS 10 is manufactured or configured for distribution to a customer. Moreover, depending on the amount of data desired to be stored in the BS 10, the BS 10 may comprise a small hard drive memory device to complement the storage capacity of the memory 19 if the memory is in the form of random access memory and/or read only memory. Furthermore, the BS 10 may be configured to retrieve map data via a hardwire connection to the Internet (which capability is supported by the BS 10) by way of the network interface unit 22. Such retrieval may be useful in order to populate the map database 200 with relevant data and/or to update the map data of the map database 200 from time to time. The map data contained in the map database 200 reveals the location and arrangement of man-made physical environment features, such as buildings, signs, poles, as well as naturally occurring features such as hills, valleys, etc., that may affect propagation of wireless signals transmitted by the BS 10. Each of these man-made and naturally occurring features has relevance in terms of the geographical surface area they occupy as well as their height above the ground, e.g., number of floors of a building or tower, etc. because they can affect the propagation of RF signals. Examples of a source of useful map data are the map data made available by the Google™ service, and in particular the Google™ Earth service.

As described further hereinafter, the controller 18 is configured to select radiation pattern data for an optimal one of the plurality of radiation patterns and to select appropriate antenna weights that are applied to a transmission to produce a plurality of transmit signals that the transmitter 16 couples to corresponding ones of the plurality of antennas 12(1)-12(M) in order to send the transmission with that selected (beamformed) radiation pattern. The logic or computational elements that apply the antenna weights to the transmission may reside in the controller 18 or the transmitter 16, or in a separate element entirely. Operation of the process logic 100 is described hereinafter in conjunction with FIGS. 3-5.

The functions of the controller 18 may be implemented by logic encoded in one or more tangible media (e.g., embedded logic such as an application specific integrated circuit, digital signal processor instructions, software that is executed by a processor, etc.), wherein the memory 19 stores data used for the computations described herein and/or to store software or processor instructions that are executed to carry out the computations described herein. Thus, the process 100 may be implemented with fixed logic or programmable logic (e.g., software/computer instructions executed by a processor) and the controller 18 may be a programmable processor, programmable digital logic (e.g., field programmable gate array) or an application specific integrated circuit (ASIC) that comprises fixed digital logic, or a combination thereof. Again, some or all of the controller functions described herein, such as those in connection with the process logic 100, may be implemented in a modem.

A pico or mini BS is a BS device that is configured to serve a smaller coverage area and a fewer number of wireless client devices than a standard base station. Thus, the BS 10 may be a pico BS insofar as it may have lower transmit power capability than a standard BS so that its coverage area is smaller than that of a standard BS. The configuration and gain of the antennas 12(1)-12(M) for a pico BS may be less powerful than that of a standard BS. Also, the signal processing capability (e.g., of the controller 18) may be less than that of a standard BS so that a pico BS can serve a fewer number of wireless client devices at any given time (i.e., it has a lower capacity). It should be understood that techniques and concepts described herein are particularly useful for a pico or mini BS, but they also may be useful in a standard base station device that is configured to serve larger coverage areas than a pico base station.

Figure 2:
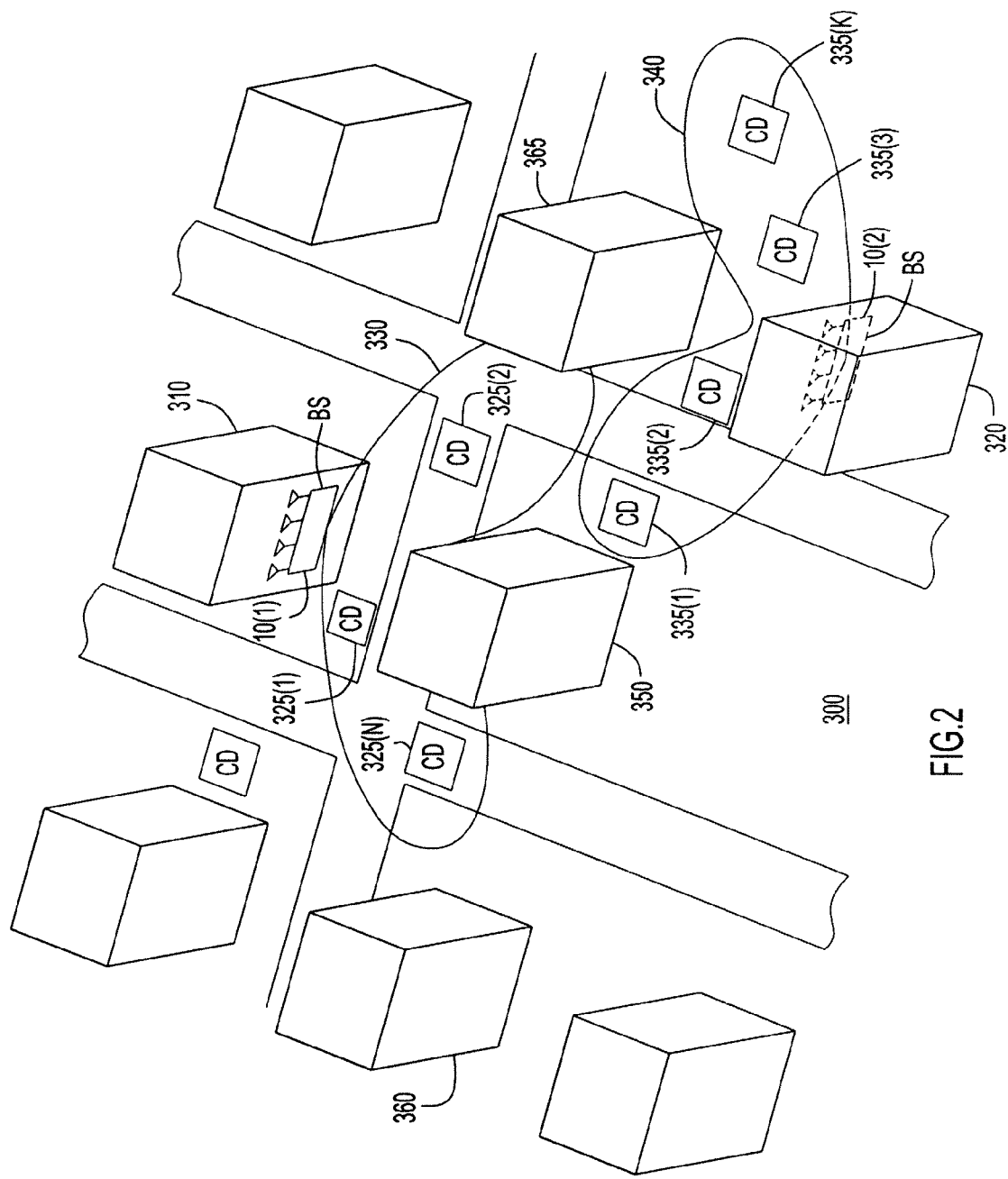
FIG. 2 is a diagram depicting an urban environment where the base station automatically optimizes its radiation pattern for serving mobile stations within its coverage area.

Turning to FIG. 2, a diagram is shown of an example of an urban geographical setting or environment 300 where two BS's of the type shown in FIG. 1 are deployed. It is to be understood that this diagram is not to scale. For example, a first BS 10(1) is deployed or installed on an exterior wall of a building 310 and a second BS 10(2) is deployed on an exterior wall of building 320. The BS 10(1) is configured to serve wireless client devices (CDs) 325(1)-325(N) and the BS 10(2) is configured to serve CDs 335(1)-335(K). Upon initial deployment or installation, each of the BSs 10(1) and 10(2) is configured to automatically determine its geographical location, evaluate its geographical location based on geographical map data that indicates the physical geographical environment surrounding its geographical location, and determine a radiation pattern best suited to serve wireless client devices within a coverage area based on the physical geographical environment surrounding the geographical location of the apparatus.

As explained above, the map data stored in the map database 200 of each of the BSs 10(1) and 10(2) contains information about the location of physical features (buildings, etc.) in its surrounding environment, the amount of surface area they occupy as well as their height above the ground. When the BSs 10(1) and 10(2) are installed, they are configured to execute the self-optimizing process logic 100 in order to find the best radiation pattern for the physical geographical environment surrounding its location and for its intended coverage area. For example, when the BS 10(1) is to serve a coverage area where CDs, such as CDs 325(1)-325(N) are located, the BS 10(1) will execute the process logic 100, determine its location within the urban setting 300, determine the types and locations of man-made and natural features, e.g., buildings 350, 360 and 365, that would affect propagation of RF signals and consequently its ability to communicate with CDs in its coverage area, and then determine that the radiation pattern 330 should be employed to best serve that coverage area. Similarly, BS 10(2) executes the process logic 100 to determine the radiation pattern to be employed to best serve CDs, such as CDs 335(1)-335(K). In the case of BS 10(2) for the example shown in FIG. 2, building 365 would affect its ability to serve those CDs and thus would select and use a radiation pattern such as the one shown at 340. In the example geographical surroundings depicted in FIG. 2, both the BS's 10(1) and 10(2) would be select a radiation pattern similar to the one shown in FIG. 6D, described hereinafter, where the BS 10(1) would use that radiation pattern with an opposite orientation from the way that the BS 10(2) would use it. Furthermore, as explained further hereinafter in connection with FIGS. 3-5, the BSs 10(1) and 10(2) are configured to dynamically adjust their radiation patterns for a variety of reasons in order to improve network performance. For example, the BSs 10(1) and/or 10(2) may adjust their radiation patterns after initial deployment so as to minimize inter-cell (inter-coverage area) interference with each other, or to optimize performance with respect to a certain location (where one or more CDs reside) within their respective coverage areas.

Figure 3:
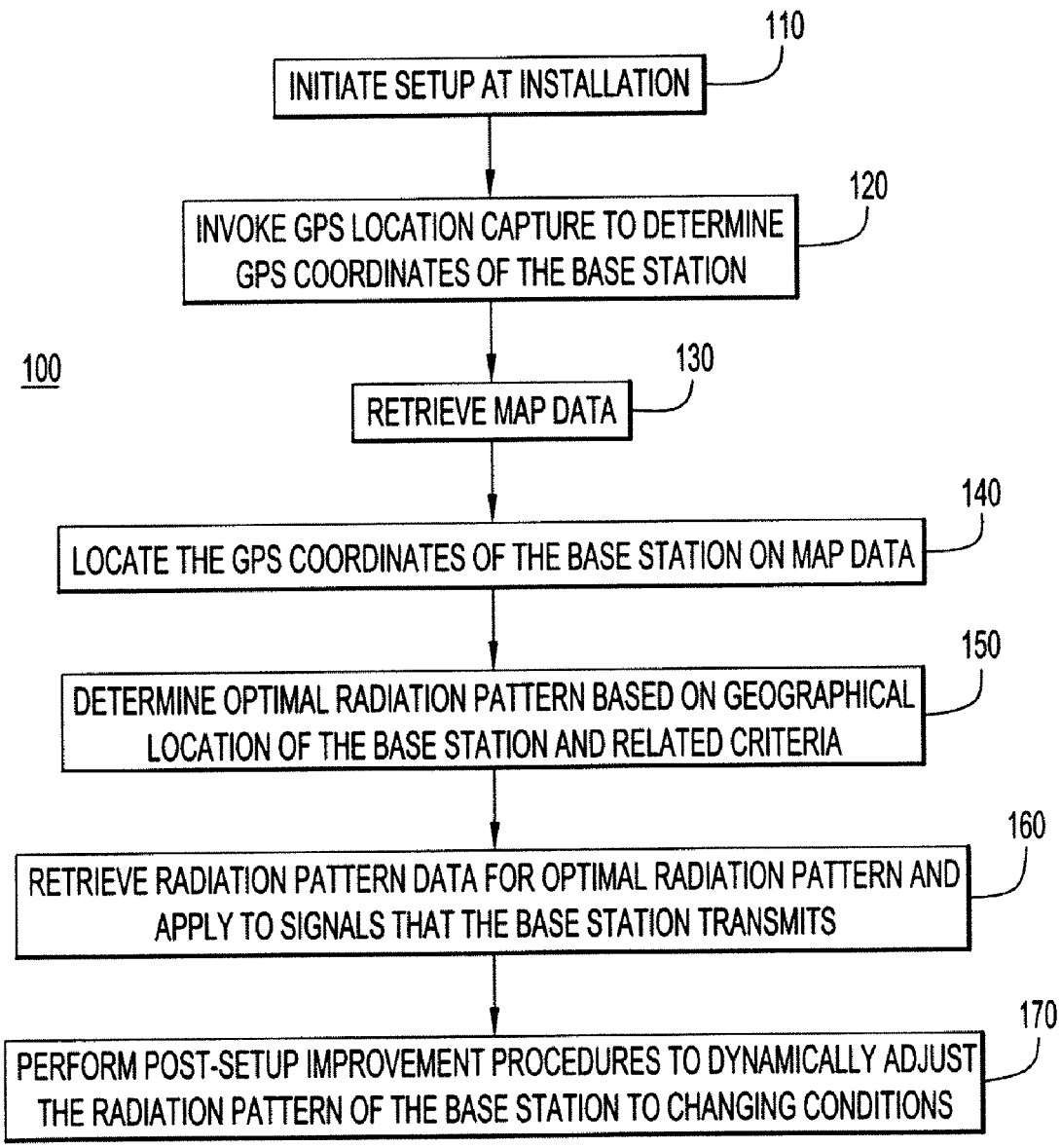
FIG. 3 is an example of a flow chart for process logic that automatically optimizes the radiation pattern in a base station.
Figure 4:
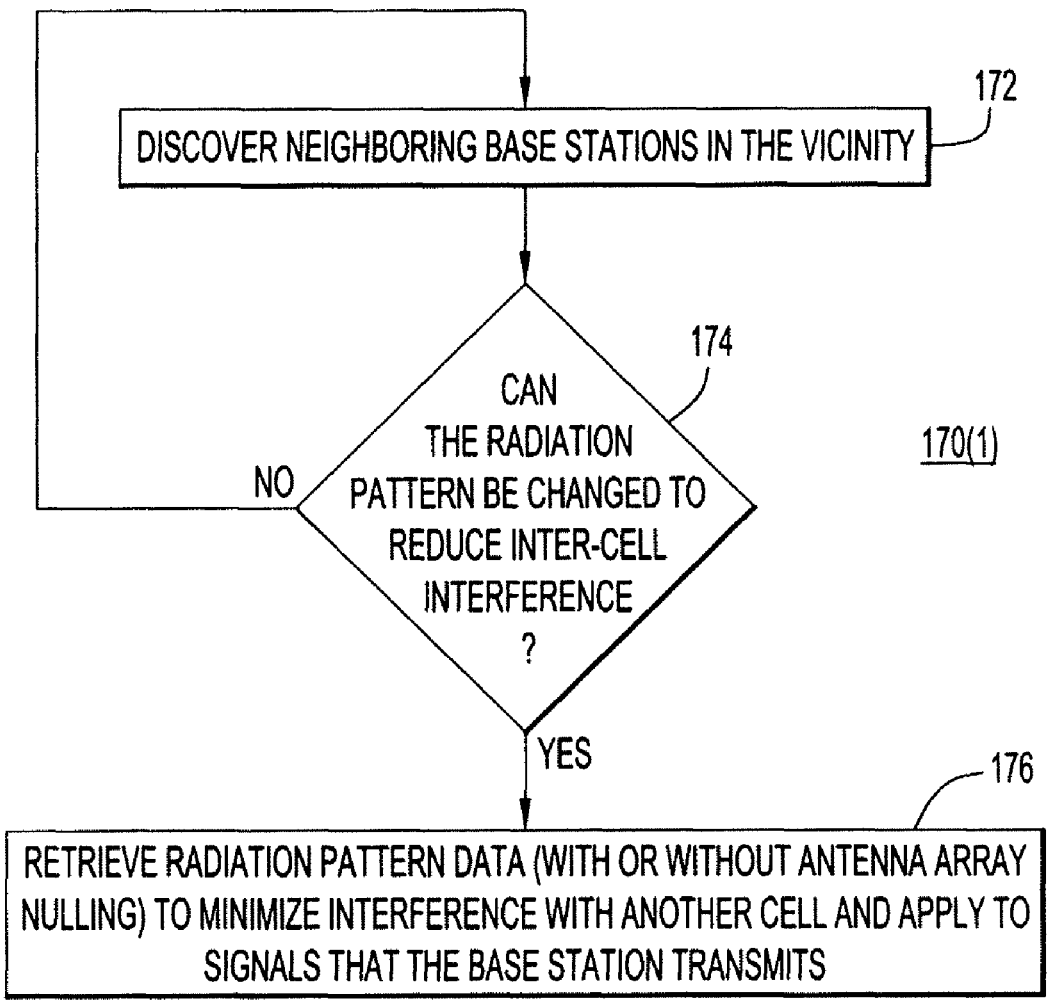
FIG. 4 is an example of a flow chart for additional process logic used by the base station to automatically adjust its radiation pattern in order to minimize inter-cell interference.
Figure 5:
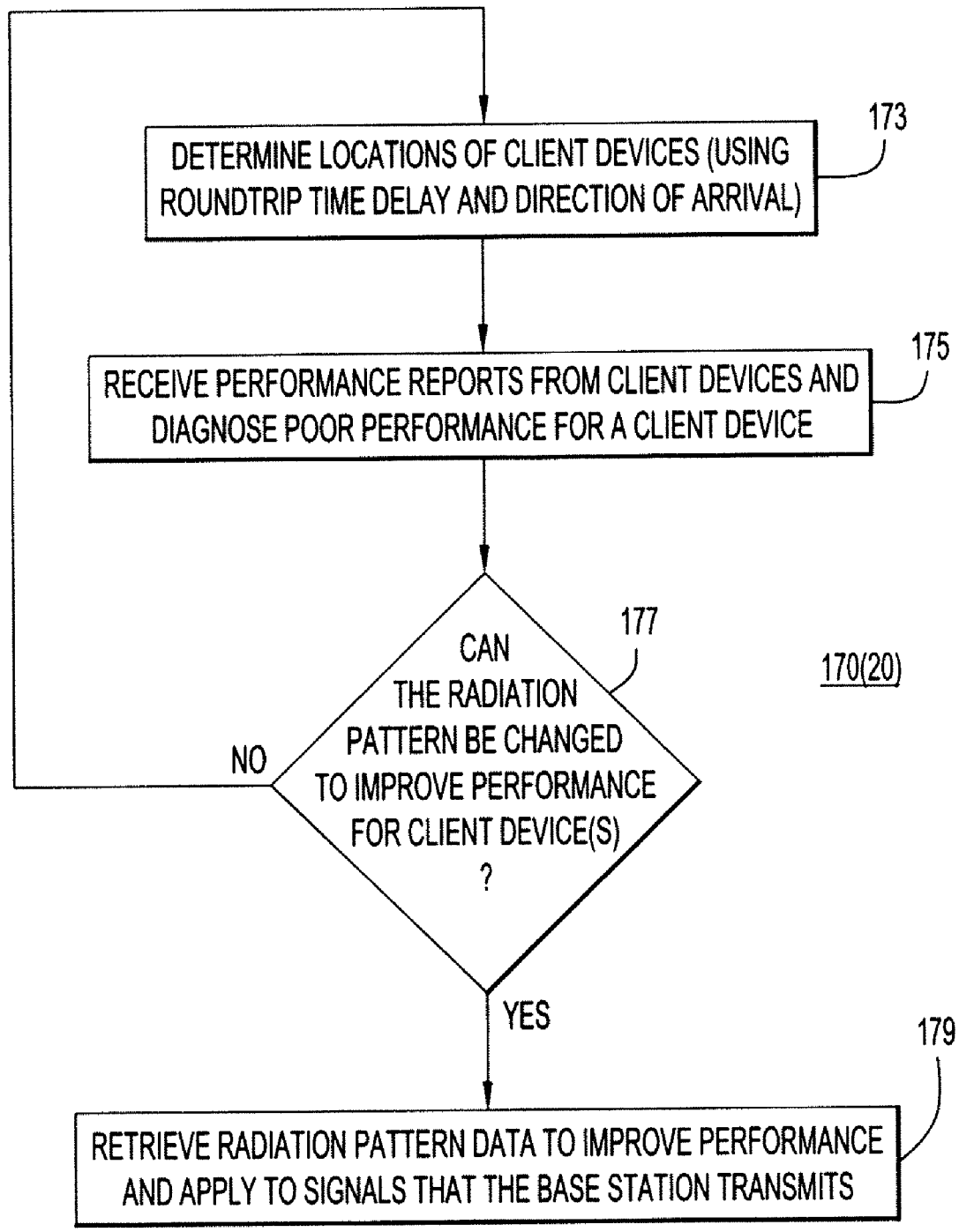
FIG. 5 is an example of a flow chart for additional process logic used by the base station to adjust its radiation pattern in order to improve performance with respect to a wireless client device at a certain location.

Turning now to FIGS. 3-5, the self-optimizing process logic 100 is described. Reference is also made to FIGS. 1 and 2 in connection with this description. At 110, the controller 18 determines that the BS 10 is powered up and that it is being installed for the first time, and thus it needs to configure itself. At 120, the controller 18 commands the positioning unit 20 to invoke a positioning session (GPS location capture) to determine a location (e.g., in the form of GPS coordinates indicating location) and height of the BS 10. The location function at 120 may be performed several times and an average of multiple location results computed for use. Next, at 130, the controller 18 retrieves map data from the map database 200 stored in memory 19.

At 140 and 150, the controller 18 evaluates the geographical location of the BS 10 based on the geographical map data retrieved from database 200 that indicates the physical geographical environment surrounding the geographical location of the BS determined at 120. More specifically, at 140, the GPS location coordinates are located on the map data so that the location within a geographical region is known, e.g., at a street intersection, traffic light pole, building wall, building roof top, etc. At 150, the controller 18 determines the optimal radiation pattern that the BS 10 should use based on its geographical location and related criteria. For example, the criteria may depend on what the intended coverage area for the BS 10 should be in a given geographical environment, such as a radiation pattern that covers all streets within the range of the BS 10 or only an area surrounding a building. Logic is programmed into the controller 18 to determine which criteria should be used at function 150 when selecting the radiation pattern that is best suited for a given coverage area. At 160, the controller 18 retrieves radiation pattern data from memory 19 for the optimal radiation pattern determined at 150 and uses that data to apply appropriate processing to a transmission that the BS transmits. For example, at 160, the controller 18 retrieves data for a particular set of antenna weights among data for a plurality of sets of antennas weights, each set for a different one of a plurality of radiation patterns, wherein the particular set of antenna weights produces the radiation pattern determined to be best suited to serve wireless client devices within the coverage area. The transmission may consist of a single transmit signal stream or of multiple transmit signals streams to be sent simultaneously, the latter of which is known as a multiple-input multiple-output (MIMO) transmission. The radiation pattern data may be designed so that the synthesized radiation pattern uses the output power emitted from all of the antennas 12(1)-12(M), thereby preventing waste of transmit power for certain transmissions, such as broadcast transmissions.

As explained above, the BS 10 uses the radiation pattern derived from its geographical location and map data for transmitting broadcast messages and in so doing the radiation pattern determines the coverage of the BS 10. However, in some cases where the BS 10 does not have an accurate estimate of beamforming weights for a particular CD, the BS 10 may use the same radiation pattern otherwise used for broadcast messages for transmitting unicast or directed messages to the particular CD.

At 170, a post-setup phase of the process logic 100 is entered during which the controller 18 dynamically adjusts the radiation pattern used by the BS according to changing conditions or other information that the BS learns with respect to its surrounding RF environment, such as locations of neighboring BSs, etc. Examples of such adjustments are described hereinafter in conjunction with FIGS. 4 and 5.

Turning now to FIG. 4, process logic for a first example of a post-setup adjustment function 170(1) is described. At 172, through communications made over the Internet either directly between BSs or through a network management system, any given BS may learn about the existence and location of other BSs in its general vicinity. At 174, the controller 18 determines whether it can and should adjust its radiation pattern in order to reduce or minimize inter-cell interference associated with another (nearby) coverage area served by a neighboring BS. If it is determined that there is a potential for such interference with a neighboring BS and such interference can be mitigated by changing the radiation pattern used by the BS, then at 176, the radiation pattern data for a new or different radiation pattern is retrieved and applied to signals transmitted (e.g., for broadcast messages or perhaps unicast messages to a particular CD) by the BS in order minimize interference in a neighboring cell. For example, the radiation pattern data may include data to perform antenna array nulling in order to reduce inter-cell interference. In the context of deployment of numerous pico BSs in an urban setting, RF planning is quite complicated. Moreover, installation of pico BSs may be made by non-experts (with non-optimal antenna placements and orientations, may increase the likelihood for inter-cell interference. Thus, the ability of a BS to automatically adjust its radiation pattern using nulling or other techniques to reduce inter-cell interference is very useful in an urban deployment setting of pico-BSs. In fact, it is possible that a network of pico-BSs can be built that operates with a carrier-to-interference (C/I) ratio of close to 0 dB.

Nulling algorithms generally fall into two categories, either of which may be employed by the BS at function 176 shown in FIG. 4. The first type is referred to as "explicit" nulling and this technique relies on knowledge of spatial signatures of a desired signal and of the interference. The second type is referred to as "blind" nulling and this technique does not require knowledge of the spatial signatures of the interference. In either case, the controller 18 may be configured to employ antenna nulling techniques when processing at least one signal associated with a transmission to produce a plurality of transmit signals that the transmitter 16 upconverts and couples to corresponding ones of the plurality of antennas 12(1)-12(M) in order to send the transmission.

FIG. 5 shows another example of a post-setup radiation pattern adjustment procedure at 170(2). At 173, the BS determines the location of each of the CDs it is serving in its coverage area. The BS may determine the location of a CD using a variety of location techniques now known or hereinafter developed. For example, the WiMAX communication protocol supports a feature called round trip delay (RTD). RTD is a measurement of the overall delay encountered in both the transmit direction from the BS to the CD and the receive direction from the CD to the BS. RTD is calculated between the CD and the BS using timing advance information which has been received by the CD. In addition, the BS can use direction of arrival (DOA) signal processing techniques with respect to signals received at its plurality of antennas 12(1)-12(M) from a given CD to derive a spatial signature for the CD. Using RTD and DOA for a given CD, the BS can determine an estimate of a location of a CD. Another way to determine the location of a CD is for the CD to transmit a GPS location determined by the CD's GPS location capability, assuming the CD has such capability.

Next, at 175, the BS receives messages containing performance reports from CDs that it serves and it diagnoses poor performance for a given CD. Then, at 177, a determination is made as to whether the BS can change its radiation pattern in order improve performance for one or more CDs that it serves. If so, then at 179, the controller 18 retrieves radiation pattern data from stored radiation pattern data in order to improve performance and applies that radiation pattern data to transmissions (e.g., for broadcast messages or perhaps unicast messages to a particular CD) that the BS makes.

For example, one or more CDs in a given portion of a coverage area of a BS may experience consistently poor data rate and poor transmit uplink power margin. The transmit uplink power margin is the transmit power available for potential modulation/coding scheme or channel changes. For example, zero power margin means there is no power available for any changes. The WiMAX communication protocol requires a CD to send reports to the BS indicating the CD's transmit power margin. The BS receives such reports from its CDs and can diagnose therefrom poor performance in a given region of its coverage area. The BS may select a better radiation pattern in order to improve service to that portion of the coverage area.

As another example, the BS may become overloaded due to numerous CDs within a relatively small portion of its coverage area. The BS may adjust its radiation pattern in order to reduce or eliminate coverage at a given location so that at least one CD at the location becomes served by another BS. Specifically, when a first BS knows that there is a second BS which has the coverage to that same area, the first BS can change its radiation pattern in order reduce its coverage to that portion of its coverage area, thereby offloading some of its traffic responsibility to ensure proper operation for other CDs in its coverage area. When the CDs that were being served by the first BS lose the signal from the first BS as a result of the first BS changing its radiation pattern, those CDs will eventually associate to the second BS through ranging signals transmitted by the CDs or other mechanisms. This may be referred to as location selective load balancing.

Still another example is one in which the CDs transmit a message containing a carrier-to-interference-plus-noise (CINR) report to the BS. This again is a feature of the WiMAX communication protocol. The CINR report from a CD may indicate poor performance even though coverage to that area where the CD is located is good as determined by the BS through a level of a received ranging signal from that CD. A CD that is experiencing poor CINR but is otherwise in a good coverage area indicates that there is likely co-channel interference from a nearby BS operating on the same frequency causing the poor CINR. In this situation, the BS may adjust its radiation pattern (for broadcast messages) to reduce coverage to that area so the CDs in that area will receive a dominant signal from one BS only, a BS associated with a neighboring coverage area. This feature is referred to herein as area selective cell wilting.

The BS may make the decision to adjust its radiation pattern through knowledge it learns by monitoring signals from CDs in its coverage area and knowledge of its neighboring BSs. Thus, a BS can autonomously make changes to its radiation pattern or can collaborate with one or more other BSs to make changes to its radiation pattern.

The self-optimizing techniques described herein may involve the use of pre-stored radiation pattern data to synthesize one or more of a plurality of radiation patterns. Another way to generate various radiation patterns is to make adjustments to a nominal set of antenna weights without actually storing data for a different set of antenna weights for each of a plurality of antenna weights. For example, if the nominal set of antenna weights is known to produce a given radiation pattern, then the controller 18 is configured to make certain adjustments to one or more of the antenna weights in order to achieve a different desired radiation pattern.

Figure 6A:
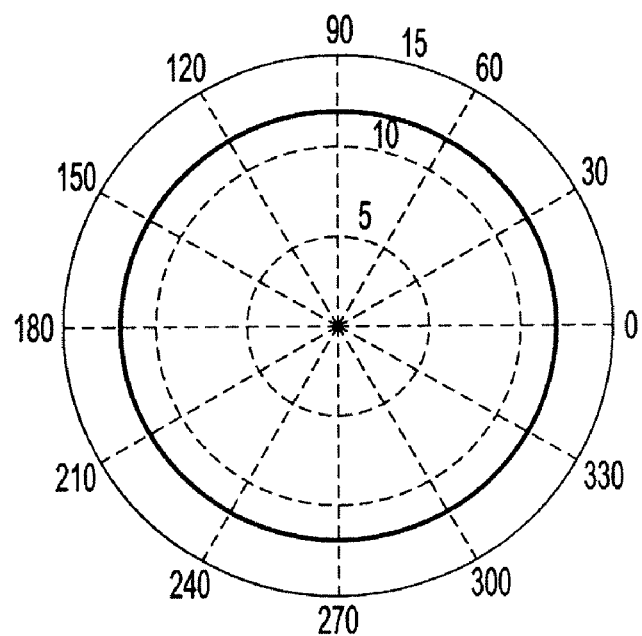
FIGS. 6A-6G are plots depicting examples of radiation patterns that the base station may automatically select for use according to the techniques described herein.

FIGS. 6A-6G illustrate examples of radiation patterns that a BS may be configured to automatically select from when serving a coverage area. FIG. 6A is an example of an omnidirectional radiation pattern. This type of radiation pattern is useful for a standard circular type coverage area.

Figure 6B:
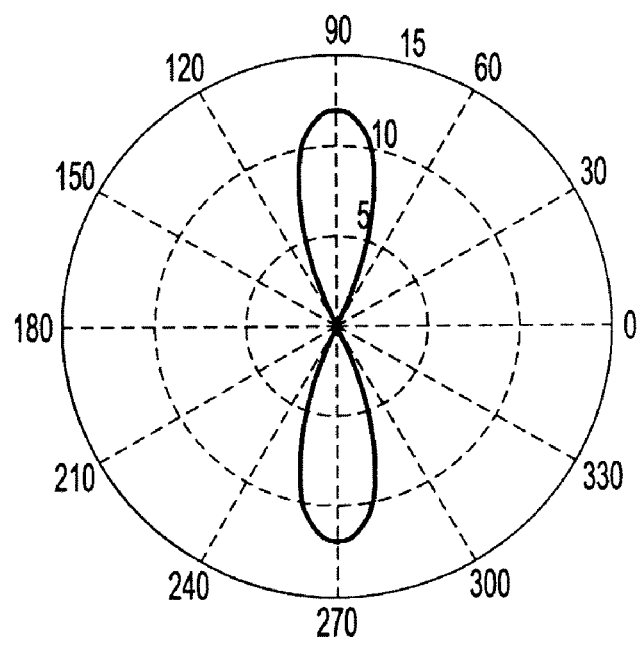

FIG. 6B is an example of a radiation pattern comprising opposing beams that are relatively narrow. The radiation pattern of FIG. 6B may be suitable to provide coverage in a relatively narrow coverage area on opposite sides of a base station, particularly when there are tall buildings along opposite sides of the coverage area on both sides of the base station.

Figure 6C:
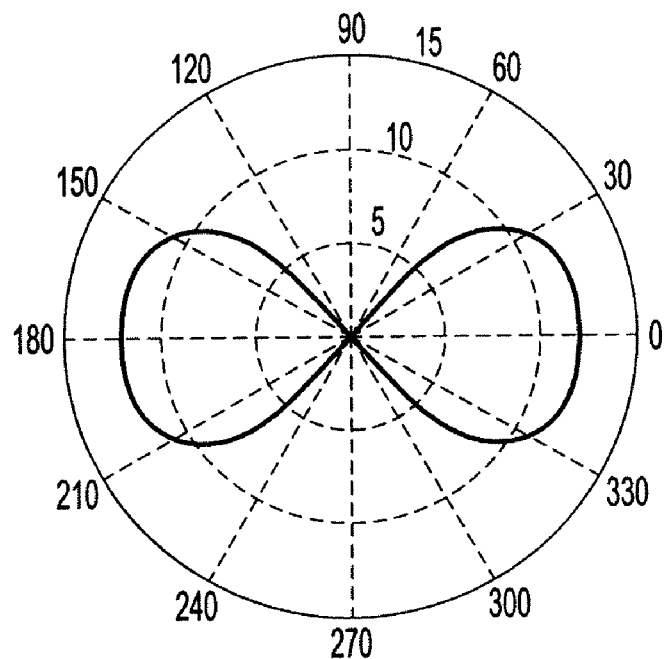

FIG. 6C is an example of a radiation pattern comprising opposing beams that are relatively wide. This radiation pattern may be useful to provide coverage in a relatively wide coverage area on opposite sides of a base station.

Figure 6D:
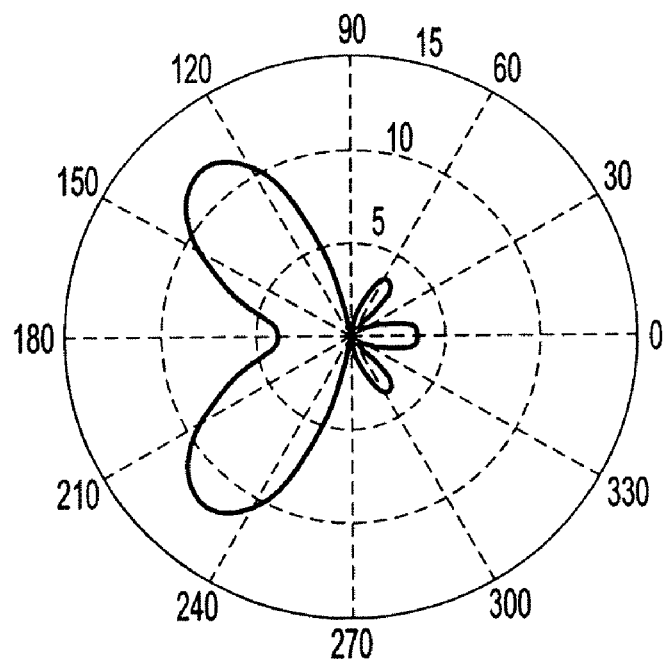

FIG. 6D is an example of a radiation pattern comprising two beams that are slightly offset from each other. This radiation pattern may be useful to steer beams into areas around a tall building.

Figure 6E:
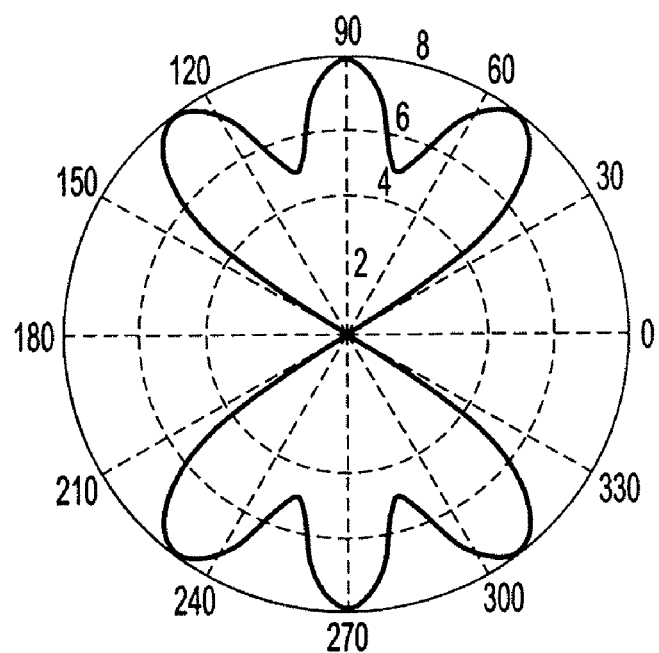

FIG. 6E is an example of a radiation pattern comprising three opposing beams. The radiation pattern of FIG. 6E may be useful to serve a coverage area on opposite sides of a base station, where there are multiple obstructions (buildings) on each side of the base station.

Figure 6F:
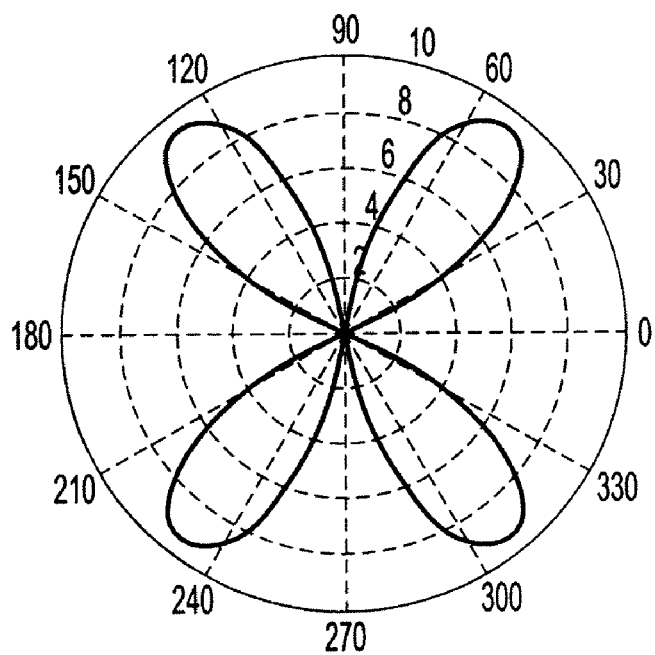
Figure 6G:
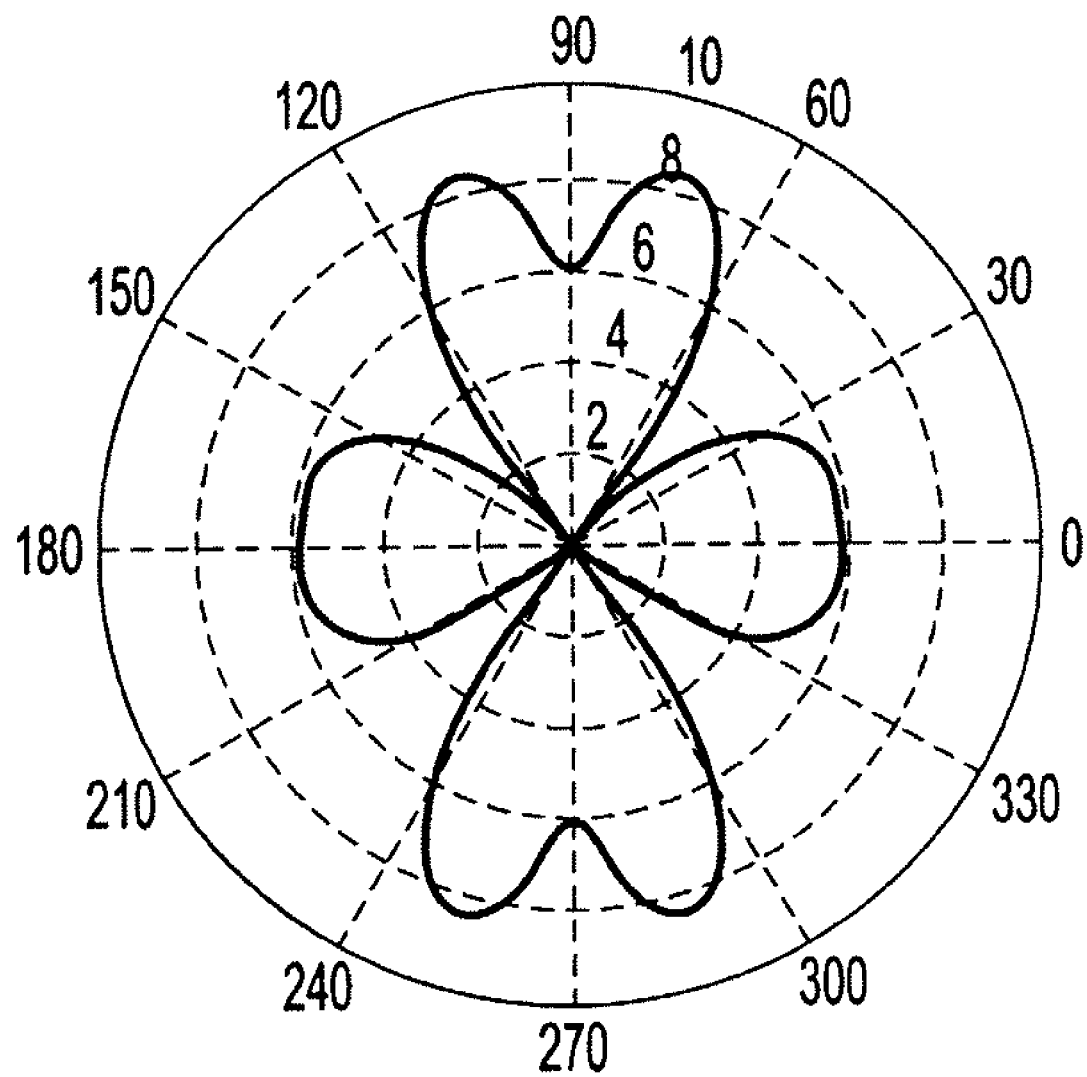

FIG. 6F is an example of a radiation pattern comprising four relatively narrow beams offset from each other by approximately ninety degrees. Similarly, FIG. 6G illustrates an example of a radiation pattern comprising four beams offset from each other by approximately ninety degrees, and where two of the four beams that are opposing each other are somewhat wider than the other two of the four beams. The radiation patterns of FIG. 6F may be useful when the coverage area of the base station is to include areas set apart in multiple directions from the base station.

Worth noting in FIGS. 6A-6G is that some of the beams in the radiation patterns are longer (i.e., stronger) than other beams. This indicates that the "reach' of the beam will go a greater distance than the reach of the shorter beams. Again, it may be desirable to select a pattern with a shorter reach in order to intentionally remove one or more client devices from the coverage area of a base station so that the one or more client devices eventually seek and obtain coverage from another base station, or to avoid interference in an adjacent coverage area.

FIGS. 6A-6G are meant by way of example only and it should be understood that the BS may be configured to generate numerous other radiation patterns.

The self-optimizing base station described herein is configured to automatically (and dynamically) adjust its radiation pattern (through antenna array beam synthesis) to best fit its installation environment. In addition, the base station is configured to detect locations of users to self-diagnose and correct network performance related issues. Location detection may be achieved via a variety of techniques, including spatial signature detection (direction of arrival) and round trip delay of signals between the base station and a particular wireless client device. Further still, the base station is configured to suppress inter-cell interference (via antenna array nulling or other suitable techniques) so that the wireless network (comprised of numerous cells each served by a corresponding base station) can operate with a C/I ratio of nearly 0 dB.

The self-optimizing techniques described herein are particularly useful for a base station that is configured to serve a smaller coverage area (and a fewer number of CDs) than a standard base station, e.g., a so-called pico or mini base station as referred to herein. However, this is only one example, and again, it should be understood that these techniques may be useful in a standard base station device that is configured to serve larger coverage areas than a pico base station.

Although the apparatus, logic, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, logic, and method, as set forth in the following claims.

What is claimed is:

1. An apparatus comprising:
a plurality of antennas;
a transmitter that is configured to connect to the plurality of antennas and to produce a plurality of individual transmit signals associated with a transmission to be made via the plurality of antennas;
a positioning unit that is configured to determine a geographical location of the apparatus;
a memory comprising stored geographical map data defining types and locations of man-made and natural features present in the physical geographical environment surrounding the geographical location of the apparatus that affect propagation of wireless signals; and
a controller configured to:
evaluate the geographical location of the apparatus based on the stored geographical map data; and
determine a radiation pattern best suited to serve wireless client devices within a coverage area based on the types and locations of the man-made and natural features in the physical geographical environment surrounding the geographical location of the apparatus.

2. The apparatus of claim 1, wherein the controller is further configured to apply antenna weights to at least one signal associated with the transmission to produce the plurality of transmit signals that the transmitter couples to corresponding ones of the plurality of antennas in order to send the transmission with the radiation pattern.

3. The apparatus of claim 2, wherein the memory is configured to store data representing a set of antenna weights for each of a plurality of radiation patterns, and wherein the controller is configured to select and retrieve from the stored data the antenna weights associated with a radiation pattern determined to be best suited based on the types and locations of the man-made and natural features in the physical geographical environment surrounding the geographical location of the apparatus.

4. The apparatus of claim 3, wherein the controller is further configured to determine a radiation pattern at installation, and to thereafter adjust the radiation pattern.

5. The apparatus of claim 4, wherein the controller is configured to adjust the radiation pattern used for transmissions so as to minimize interference in another coverage area.

6. The apparatus of claim 5, wherein the controller is configured to use antenna nulling techniques when processing at least one signal associated with the transmission to produce the plurality of transmit signals that the transmitter couples to corresponding ones of the plurality of antennas in order to send the transmission.

7. The apparatus of claim 4, and further comprising a receiver configured to connect to the plurality of antennas and to produce receive signals associated with transmissions received at the plurality of antennas, wherein the controller is further configured to process the receive signals in order to estimate a location of at least one wireless client device served in the coverage area and to recover performance report data contained in a transmission from the at least one wireless client device, and to adjust the radiation pattern when the performance report data indicates poor performance at the location of the at least one wireless client device in order to improve performance at the location.

8. The apparatus of claim 7, wherein the controller is configured to adjust the radiation pattern in order to reduce coverage at the location so that the at least one wireless client device becomes served by another base station.

9. The apparatus of claim 1, wherein the positioning unit is a global positioning system positioning unit that is configured to receive signals from multiple satellites in order to obtain a location of the apparatus.

10. A method comprising:
at a wireless base station device that is configured to serve wireless client devices in a coverage area, determining a geographical location of the base station device;
storing geographical map data defining types and locations of man-made and natural features present in the physical geographical environment surrounding the geographical location of the apparatus that affect propagation of wireless signals
evaluating the geographical location of the base station device based on the stored geographical map data; and
determining a radiation pattern best suited to serve wireless client devices within a coverage area based on the types and locations of the man-made and natural features in the physical geographical environment surrounding the geographical location of the base station device.

11. The method of claim 10, and further comprising applying antenna weights to at least one signal associated with the transmission to produce a plurality of transmit signals for transmission via a plurality of antennas of the base station device.

12. The method of claim 10, wherein said evaluating and determining are performed upon initial installation of the base station device, and further comprising adjusting the radiation pattern.

13. The method of claim 12, wherein adjusting comprises adjusting the radiation pattern so as to minimize interference in at least one coverage area served by another base station device.

14. The method of claim 12, and further comprising receiving at the base station from a wireless client device a message containing a performance report indicating performance of the at the wireless client device, and adjusting the radiation pattern based on the performance report.

15. The method of claim 14, wherein adjusting comprises adjusting the radiation pattern based on a location of the wireless client device in order to improve performance at the location.

16. The method of claim 15, wherein adjusting comprises adjusting the radiation pattern in order to reduce coverage at the location so that at least one wireless client device at the location becomes served by another wireless base station device.

17. One or more computer readable storage media encoded with software comprising computer executable instructions and when the software is executed operable to:
at a wireless base station device that is configured to serve wireless client devices in a coverage area, determine a geographical location of the base station device;
store geographical map data defining types and locations of man-made and natural features present in the physical geographical environment surrounding the geographical location of the apparatus that affect propagation of wireless signals;
evaluate the geographical location of the base station device based on the stored geographical map data; and
determine a radiation pattern best suited to serve wireless client devices within a coverage area based on the types and locations of the man-made and natural features in the physical geographical environment surrounding the geographical location of the base station device.

18. The computer readable storage media of claim 17, and further comprising instructions configured to apply antenna weights to at least one signal associated with the transmission to produce a plurality of transmit signals for transmission via a plurality of antennas of the base station device.

19. The computer readable storage media of claim 18, and further comprising instructions configured to retrieve from memory data for a particular set of antenna weights among data for a plurality of sets of antenna weights, each set for a different one of a plurality of radiation patterns, wherein the particular set of antenna weights produces the radiation pattern determined to be best suited to serve wireless client devices within the coverage area.

20. The computer readable storage media of claim 17, wherein the instructions that determine comprise instructions configured to determine the radiation pattern at installation of the base station device, and further comprising instructions configured to thereafter adjust the radiation pattern.

21. The computer readable storage media of claim 20, wherein the instructions that adjust the radiation pattern comprise instructions configured to adjust the radiation pattern in order to minimize interference in another coverage area.

22. The computer readable storage media of claim 18, wherein the instructions that adjust the radiation pattern comprise instructions configured to adjust the radiation pattern at a location of at least one wireless client device in the coverage area based on a performance report received from the at least one wireless client device and the location of the at least one wireless client device.

* * * * *